Oct. 27, 1925.
M. B. MATHIAS
1,558,698
HEN NEST AND TRAP
Filed Feb. 24, 1925      2 Sheets-Sheet 1
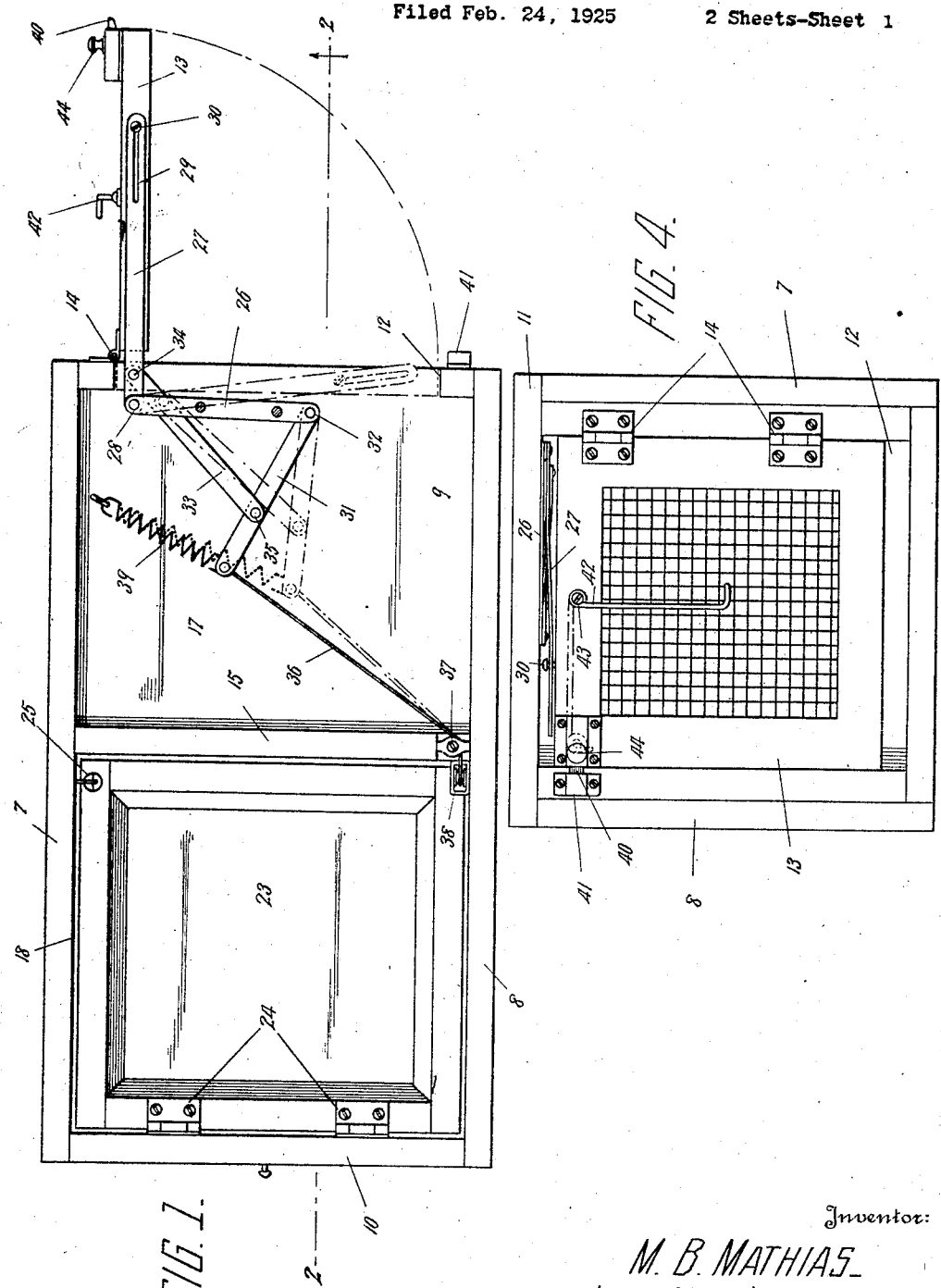
Inventor:
M. B. MATHIAS
By Monroe E. Miller
Attorney.

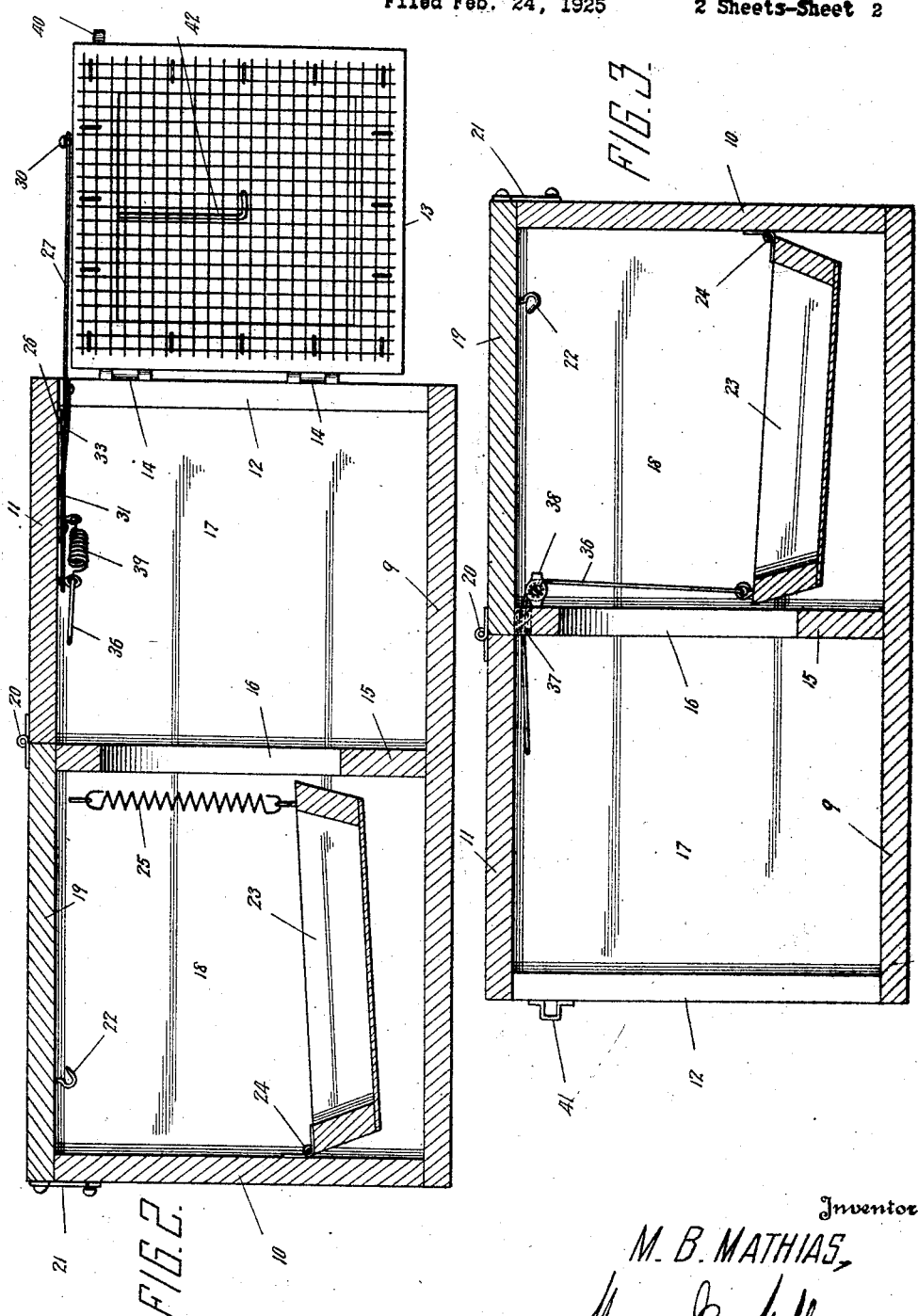

Patented Oct. 27, 1925.

1,558,698

UNITED STATES PATENT OFFICE.

MANUEL BROWN MATHIAS, OF HANFORD, CALIFORNIA.

HEN NEST AND TRAP.

Application filed February 24, 1925. Serial No. 11,250.

*To all whom it may concern:*

Be it known that I, MANUEL BROWN MATHIAS, a citizen of the United States, residing at Hanford, in the county of Kings and State of California, have invented certain new and useful Improvements in a Hen Nest and Trap, of which the following is a specification, reference being had therein to the accompanying drawing.

The present invention relates to a trap device that may be used either as a hen nest or as a trap for catching rabbits and other animals, and it is an object of the invention to provide a novel and improved device of that kind.

Another object is the provision of such a device which has a novel combination and assemblage of the component elements whereby the device is practical and efficient in operation.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the device, with the top removed, showing the door or closure open in full lines and closed in dot and dash lines.

Fig. 2 is a vertical longitudinal section on the line 2—2 of Fig. 1.

Fig. 3 is a sectional view on the same line looking in the opposite direction.

Fig. 4 is a front end view of the device with the door closed.

The casing, which may be of metal or wood, comprises the side walls 7 and 8, bottom 9, rear end wall 10 and top 11, the casing having its forward end open to provide an entrance 12. A door or closure 13 is provided to close the entrance or opening 12 and is hinged, as at 14, to the casing at one vertical edge of the entrance or opening 12 to swing open outwardly. The door is preferably provided with a screen panel for purpose of ventilation and to enable the occupant of the casing to be seen. The casing has a partition 15 between its front and rear ends provided with an opening 16 connecting the chambers 17 and 18 in front and in rear of said partition, respectively. The top 11 has a loose section 19 hinged, as at 20, to swing open upwardly so as to obtain access to the chamber 18, and said top section 19 is held closed by a suitable catch 21. A hook 22 is suspended from the top section 19 within the chamber 18 for hanging bait of suitable kind in said chamber to entice the animals into the casing that it may be desired to catch, the bait being readily placed on the hook when the top section 19 is raised.

A yieldable platform or tray 23 is disposed within the chamber 18, being hinged, as at 24, to the rear wall 10 so as to swing upwardly and downwardly. A coiled spring 25 yieldingly supports said platform or tray and is disposed at one side and connected to the platform and side wall 7. Said platform or tray may be used as a hen nest, or as an operating member for catching an animal, the depression of the platform in either event closing the door 13.

The door operating means comprises a bar or strip 26 secured to the top 11 adjacent to the opening 12, and at the under surface of said top. The bar 26 may be secured to the top 11 in any suitable manner, such as by screws, nails, or the like, passing through the bar and up into the top, as shown in cross section between the ends of the bar in Fig. 1. A lever 27 has one end pivoted, as at 28, to the bar 26 adjacent to the hinge 14 and projects over the upper edge of the door 13. The free terminal of said lever 27 has a longitudinal slot 29 receiving a screw or pin 30 secured in the upper edge of the door, whereby the door will swing with the lever 27. A lever 31 is pivoted, as at 32, to the opposite end of the bar 26 and projects rearwardly therefrom, and said levers are connected by a link 33 which is pivoted as at 34 and 35 with the levers 27 and 31, respectively. The pivot 34 is located closer to the pivot 28 than the pivot 35 is located with reference to the pivot 32, whereby the lever 27 will swing through a larger angle than the lever 31 to provide for the quick movement of the door 13 when the lever 31 is swung. A cord or flexible element 36 is connected to the free end of the lever 31 and passes over pulleys or guides 37 and 38 and has its opposite end secured to the platform 23. The pulley 37 is mounted on the partition 15 adjacent to the side wall 8 and the pulley 38 is carried by said side wall for guiding the flexible element over said partition between the lever 31 and platform. A coiled spring 39 connects the top 11 and lever 31 to swing said lever in a direction so as to swing the door 13 open, and pull the flexible element 36 to raise the platform 23. The spring 25 may be eliminated when the spring 39 is of sufficient strength to open the door 13 and raise the platform 23.

In order to hold the door 13 closed, when it is desired to trap and catch the animal entering the casing, a spring latch 40 is carried by the door 13 to snap into a keeper 41 carried by the casing when the door is closed, and a hook 42 is pivoted, as at 43, to the door 13 and is engageable with the knob 44 of the latch 40 to hold said latch retracted, when desired, so as to prevent the door from being latched. This enables the device to be used for the two purposes, either as a hen nest or as a trap for catching animals.

When using the device as a hen nest, the latch 40 is retracted and held by the hook 42, as indicated in dot and dash lines in Fig. 4. The latch will not, therefore, engage the keeper 41 when the door is closed. When the hen enters the casing and passes on the platform 23, said platform is depressed slightly, thereby pulling the flexible element 36 and swinging the lever 31, which through the link 33 will swing the lever 27 so as to swing the door closed with a quick easy movement. The door thus provides a barrier so that the hen may remain in the casing in seclusion. When the hen leaves the platform 23 to pass out through the chamber 17, the spring 39 will immediately swing the door 13 open, the weight on the platform being relieved so that the platform can swing upwardly.

The operation in closing the door is the same when the device is used as an animal trap, the door being open when the trap is set, and when the animal passes on the platform and causes same to be depressed, the door swings closed quickly and with a smooth motion, but the hook 42 having been disengaged from the latch 40 will enable said latch to snap into the keeper 41, thereby holding the door closed even though the animal may attempt retreat through the opening 12 after having reached the platform 23. The device may be used in orchards and fields for catching rabbits and other animals, and the operative connection between the platform 23 and door 13 is such as to not only cause the door to swing closed quickly, but to also be inconspicuous and close against the top and side wall 8 of the casing.

Having thus described the invention, what is claimed as new is:—

1. A device of the character described comprising a casing having an entrance opening, a door hinged at one edge to the casing to close said opening and arranged to swing open outwardly, a depressible platform within the casing, a lever pivoted to the casing near said edge of the door and extending in the same general direction as the door along one of the edges of the door disposed at an angle to the first-named edge, said lever and secondnamed edge of the door having a sliding and pivotal connection, spring means for swinging the door open, and means connecting said lever and platform to swing the door closed when the platform is depressed.

2. A device of the character described comprising a casing having an entrance opening, a door hinged to the casing to close said opening and arranged to swing open outwardly, a depressible platform within the casing, two levers pivoted within the casing at spaced points, one lever having a sliding connection with one edge portion of the door, a link connecting the levers, the other lever projecting inwardly within the casing away from said opening, a flexible element connecting the lastnamed lever and platform, and spring means arranged to swing the door open and to raise the platform.

3. A device of the character described comprising a casing having an entrance opening, a door for said opening, a depressible platform within the casing, an operative connection between the door and platform for closing the door by the depression of the platform, spring means for opening the door, and latching means for holding the door when closed and adapted to be rendered ineffective to permit the door to open.

In testimony whereof I hereunto affix my signature.

MANUEL BROWN MATHIAS.